(12) United States Patent
Ye et al.

(10) Patent No.: US 10,644,344 B1
(45) Date of Patent: May 5, 2020

(54) CLAMPING APPARATUS AND TRANSPORT DEVICE

(71) Applicant: Contemporary Amperex Technology Co., Limited, Ningde, Fujian (CN)

(72) Inventors: Zhen Ye, Ningde (CN); Hongwen Chang, Ningde (CN); Wenqian Huang, Ningde (CN); Wancai Zhang, Ningde (CN); Guodong Li, Ningde (CN); Cunquan Wu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/370,970

(22) Filed: Mar. 30, 2019

(30) Foreign Application Priority Data

Dec. 11, 2018 (CN) .......................... 2018 1 1510658

(51) Int. Cl.
*H01M 10/04* (2006.01)
*B23P 19/00* (2006.01)
(Continued)

(52) U.S. Cl.
CPC ....... *H01M 10/0404* (2013.01); *B23P 19/006* (2013.01); *B65G 17/42* (2013.01);
(Continued)

(58) Field of Classification Search
CPC ........ B65G 17/12; B65G 17/42; B65G 17/44; B65G 47/56; B65G 47/57; B65G 47/74;
(Continued)

(56) References Cited

U.S. PATENT DOCUMENTS 4,078,654 A * 3/1978 Sarovich ................ B65G 17/42
198/804
5,203,445 A * 4/1993 Shiraiwa ........... H01L 21/67781
198/464.3
(Continued)

FOREIGN PATENT DOCUMENTS

| CN | 201913641 U | 8/2011 |
| CN | 108539117 A | 9/2018 |
| CN | 108622656 A | 10/2018 |

OTHER PUBLICATIONS

The extended European Search Report for European Application No. 19163245.4, dated May 23, 2019, 7 pages.

*Primary Examiner* — James R Bidwell
(74) *Attorney, Agent, or Firm* — Law Offices of Liaoteng Wang

(57) ABSTRACT

The present disclosure relates to a clamping apparatus and a transport device. The clamping apparatus comprises: a base; a support plate, stacked with the base in a vertical direction; a locking assembly, by which the support plate is connected to the base, wherein the locking assembly comprises a first locking member disposed on the support plate and a second locking member disposed on the base, the support plate is movable in the vertical direction and is capable of being connected to or separated from the base by connection or separation of the first locking member to or from the second locking member, and a horizontal load is able to be transmitted between the support plate and the base via the locking assembly; and a clamping assembly disposed on a surface of the support plate facing away from the base.

20 Claims, 13 Drawing Sheets

(51) Int. Cl.
*B65G 47/90* (2006.01)
*B65G 47/56* (2006.01)
*B65G 17/42* (2006.01)

(52) U.S. Cl.
CPC ........... *B65G 47/56* (2013.01); *B65G 47/901* (2013.01); *B23P 19/007* (2013.01)

(58) Field of Classification Search
CPC .... B65G 47/90; B65G 47/901; B65G 47/912; B65G 47/53; B23P 19/006; B23P 19/007; B23Q 1/262; B23Q 1/105; B23Q 1/72; H01M 10/0404; B66F 9/075
USPC ... 198/867.01, 867.02, 867.05, 803.7, 468.6, 198/346.3; 269/59, 74, 289 R
See application file for complete search history.

(56) References Cited

U.S. PATENT DOCUMENTS

| | | | | |
|---|---|---|---|---|
| 5,967,221 | A * | 10/1999 | Persson | B22C 11/02 198/867.15 |
| 6,062,799 | A * | 5/2000 | Han | H05K 7/1415 198/409 |
| 7,261,199 | B2 * | 8/2007 | Hartness | B67C 3/225 198/470.1 |
| 7,635,245 | B2 * | 12/2009 | Kaneko | A47B 53/02 198/465.1 |
| 2002/0195314 | A1 * | 12/2002 | Cho | B65G 65/00 198/346.3 |
| 2009/0065329 | A1 * | 3/2009 | Skljarow | B23Q 7/1426 198/346.3 |

\* cited by examiner

CLAMPING APPARATUS AND TRANSPORT DEVICE

CROSS REFERENCE TO RELATED APPLICATION

This application claims priority to Chinese Patent Application No. 201811510658.1, filed on Dec. 11, 2018, which is hereby incorporated by reference in its entirety.

TECHNICAL FIELD

The present disclosure relates to a technical filed of battery, and particularly to a clamping apparatus and a transport device.

BACKGROUND

With the development of technology, applications of a power battery are becoming more and more extensive, involving production or life. The power battery is also called a secondary battery and is a rechargeable battery. The power battery is widely used. For example, a low-capacity power battery can be used for a small electric vehicle, and a high-capacity power battery can be used for a large electric vehicle such as a hybrid vehicle or an electric vehicle. At present, in the logistics dispatching process of the secondary battery, the secondary battery is manually placed on a tray and then transported by the tray, resulting in that the transport operation of the secondary battery is inefficient and the labor intensity in the transport process is large.

SUMMARY

The embodiments of the present disclosure provide a clamping apparatus and a transport device. The clamping apparatus can improve the automation degree in the transport process of the secondary batteries, improve the efficiency of the transport operation and reduce the labor intensity.

On one aspect, the embodiments of the present disclosure provide a clamping apparatus for clamping and transporting secondary batteries, the clamping apparatus comprises: a base; a support plate, stacked with the base in a vertical direction; a locking assembly, by which the support plate is connected to the base, wherein the locking assembly comprises a first locking member disposed on the support plate and a second locking member disposed on the base, the support plate is movable in the vertical direction and is capable of being connected to or separated from the base by connection of the first locking member to the second locking member or separation of the first locking member from the second locking member, and a horizontal load is able to be transmitted between the support plate and the base via the first locking member and the second locking member locked to each other; and a clamping assembly disposed on a surface of the support plate facing away from the base, and comprising a first clamping jaw and a second clamping jaw spaced apart in a first horizontal direction, wherein the first clamping jaw is connected to the support plate in a horizontally movable manner and is capable of moving toward or away from the second clamping jaw to switch between a clamping position and an opening position.

According to one aspect in the embodiments of the present application, the clamping apparatus further comprises a clutch mechanism and a drive mechanism, wherein the drive mechanism is connected to the first clamping jaw via the clutch mechanism.

According to one aspect in the embodiments of the present application, the drive mechanism comprises a connector disposed below the base and a telescopic element connected to the connector, and the clutch mechanism comprises a first insertion portion disposed on the telescopic element and a second insertion portion disposed on the first clamping jaw, wherein the first insertion portion and the second insertion portion are capable of being connected together in an insertion manner or separated from each other in the vertical direction.

According to one aspect in the embodiments of the present application, one of the first insertion portion and the second insertion portion is formed as an insertion hole extending in the vertical direction, and the other one is formed as an insertion rod extending in the vertical direction.

According to one aspect in the embodiments of the present application, the clamping apparatus further comprises a telescopic energy storage mechanism disposed on the support plate, wherein the telescopic energy storage mechanism is connected to the first clamping jaw and is capable of applying a thrust force toward the second clamping jaw to the first clamping jaw when the first clamping jaw is switched from the opening position to the clamping position.

According to one aspect in the embodiments of the present application, the telescopic energy storage mechanism comprises a support member having a receiving portion, a spring disposed on the support member, and a telescopic rod disposed on the support member and connected to the spring, wherein the telescopic rod is telescopically movable in the first horizontal direction to compress or extend the spring, and a free end of the telescopic rod projecting out of the support member is connected to the first clamping jaw.

According to one aspect in the embodiments of the present application, the clamping apparatus further comprises a first limiting block and a second limiting block disposed on the support plate, wherein the first limiting block and the second limiting block are spaced apart from each other in a second horizontal direction and are both located between the first clamping jaw and the second clamping jaw, the first limiting block and the second limiting block are adapted to limit the secondary batteries, and the first horizontal direction and the second horizontal direction intersect with each other.

According to one aspect in the embodiments of the present application, the clamping apparatus further comprises a first object detecting sensor disposed below the support plate.

According to one aspect in the embodiments of the present application, the clamping apparatus further comprises a position sensor triggering member disposed below the base and located at an edge of the base.

According to one aspect in the embodiments of the present application, the support plate has a vertical lifting portion by which the support plate bears a lifting force in the vertical direction to be separated from the base.

The clamping apparatus according to the embodiments of the present disclosure comprises a support plate and a base which can be separated from each other, and a clamping assembly disposed on the support plate for clamping the secondary batteries. By use of the clamping apparatus according to the embodiments of the present disclosure, the secondary batteries can be clamped and transported quickly and conveniently, and thus, the efficient of the transport operation of the secondary batteries can be effectively improved, and the labor intensity in the transport process of the secondary batteries can be reduced.

In a further aspect, the embodiments of the present disclosure provide a transport device for transporting secondary batteries, the transport device comprises: a support platform; a first horizontal rail disposed on the support platform; the clamping apparatus as described above, movably connected to the first horizontal rail via the base and being switchable between a loading position and a lifting position; and a lifting assembly disposed on the support platform and adapted to lift and lower the support plate in the vertical direction at the lifting position, such that the support plate is switched between the lifting position and an upper unloading position and is connected to or separated from the base.

According to a further aspect in the embodiments of the present application, the support plate has a vertical lifting portion, and the lifting assembly comprises a connecting member, a vertical rail and a drive unit, wherein the connecting member is capable of being connected to the vertical lifting portion to apply a lifting force to the support plate.

According to a further aspect in the embodiments of the present application, each of two opposite edges of the support plate that extend over the base is adapted to form one vertical lifting portion, and the connecting member comprises a bracket movably connected to the vertical rail and two forked plates connected to the bracket, wherein the two forked plates are capable of being inserted below the two vertical lifting portions and applying the lifting force to the vertical lifting portions respectively.

According to a further aspect in the embodiments of the present application, the support plate has a first positioning portion, and the connecting member has a second positioning portion disposed on the forked plates, wherein the support plate and the connecting member are positioned relative to each other via the first positioning portion and the second positioning portion.

According to a further aspect in the embodiments of the present application, the transport device further comprises an unlocking mechanism capable of applying a horizontal force to the first clamping jaw at the upper unloading position, to move the first clamping jaw away from the second clamping jaw.

According to a further aspect in the embodiments of the present application, the clamping assembly comprises a second insertion portion disposed on the first clamping jaw, the unlocking mechanism comprises a support frame connected to the support platform, a third insertion portion horizontally movably connected to the support frame, and a drive element connected with the third insertion portion, wherein the second insertion portion and the third insertion portion are capable of being connected together in an insertion manner or separated from each other in the vertical direction, and the drive element is capable of moving the third insertion portion in the first horizontal direction to apply the horizontal force to the first clamping jaw portion via the second insertion portion.

According to a further aspect in the embodiments of the present application, the transport device further comprises a second object detecting sensor disposed on the lifting assembly and adapted to detect an object below the lifting assembly.

The transport device according to the embodiments of the present disclosure includes a support platform, a first horizontal rail, a clamping apparatus according to the above embodiments, and a lifting assembly. The lifting assembly is capable of raising a support plate included in the clamping apparatus by a predetermined height in the vertical direction, thereby realizing the positional change of the secondary batteries in the vertical direction. Since the lifting assembly only needs to lift the support plate, the lifting load requirement is reduced, thereby reducing the power requirement of the lifting assembly. The transport device of the present embodiment has a high degree of automation, and can effectively improve the efficiency of the transport operation of the secondary batteries, and also can reduce the labor intensity during the transport process.

BRIEF DESCRIPTION OF THE DRAWINGS

Features, advantages, and technical effects of exemplary embodiments of the present disclosure will be described below with reference to accompanying drawings.

Figure 1:
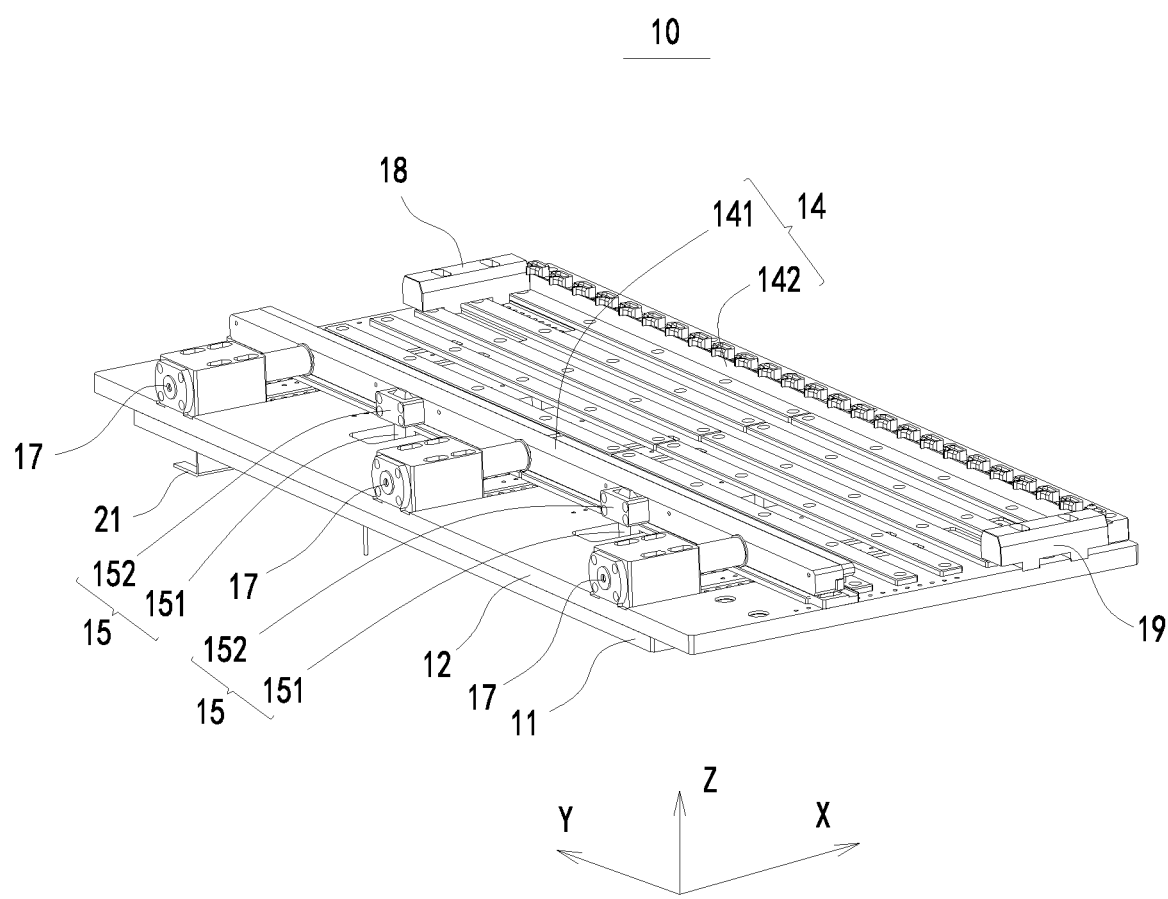
FIG. 1 is a schematic view showing a structure of a clamping apparatus according to one embodiment of the present disclosure from top.

In the drawings, the drawings are not drawn to scale.

DESCRIPTION OF REFERENCE SIGNS

10, clamping apparatus; 11, base; 12, support plate; 121, vertical lifting portion; 122, first positioning portion; 13, locking assembly; 131, first locking member; 132, second locking member; 14, clamping assembly; 141, first clamping jaw; 142, second clamping jaw; 15, clutch mechanism; 151, first insertion portion; 152, second insertion portion; 16, drive mechanism; 161, connector; 162, telescopic element; 163, gear rack; 164, gear; 17, telescopic energy storage mechanism; 171, support member; 172, telescopic rod; 173, spring; 18, first limiting block; 19, second limiting block; 20, first object detecting sensor; 21, position sensor triggering member;

22, transport device; 23, support platform; 24, first horizontal rail; 25, lifting assembly; 26, a connecting member; 261, bracket; 262, forked plate; 263, second positioning portion; 27, vertical rail; 28, drive unit; 29, unlocking mechanism; 291, support frame; 292, third insertion portion; 293, a drive element; 30, second object detecting sensor;

90, secondary battery;

400, loading position; 500, lifting position; 600, upper unloading position; 700, horizontal unloading position;

X, first horizontal direction; Y, second horizontal direction; Z, vertical direction.

DETAILED DESCRIPTION

Below, embodiments of the present disclosure will be further described in detail with reference to the drawings and embodiments. The detailed description of the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are used for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding the present disclosure, a clamping apparatus 10 and a transport device 22 according to the embodiments of the present disclosure will be described in detail below by reference to FIG. 1 to FIG. 13.

Figure 2:
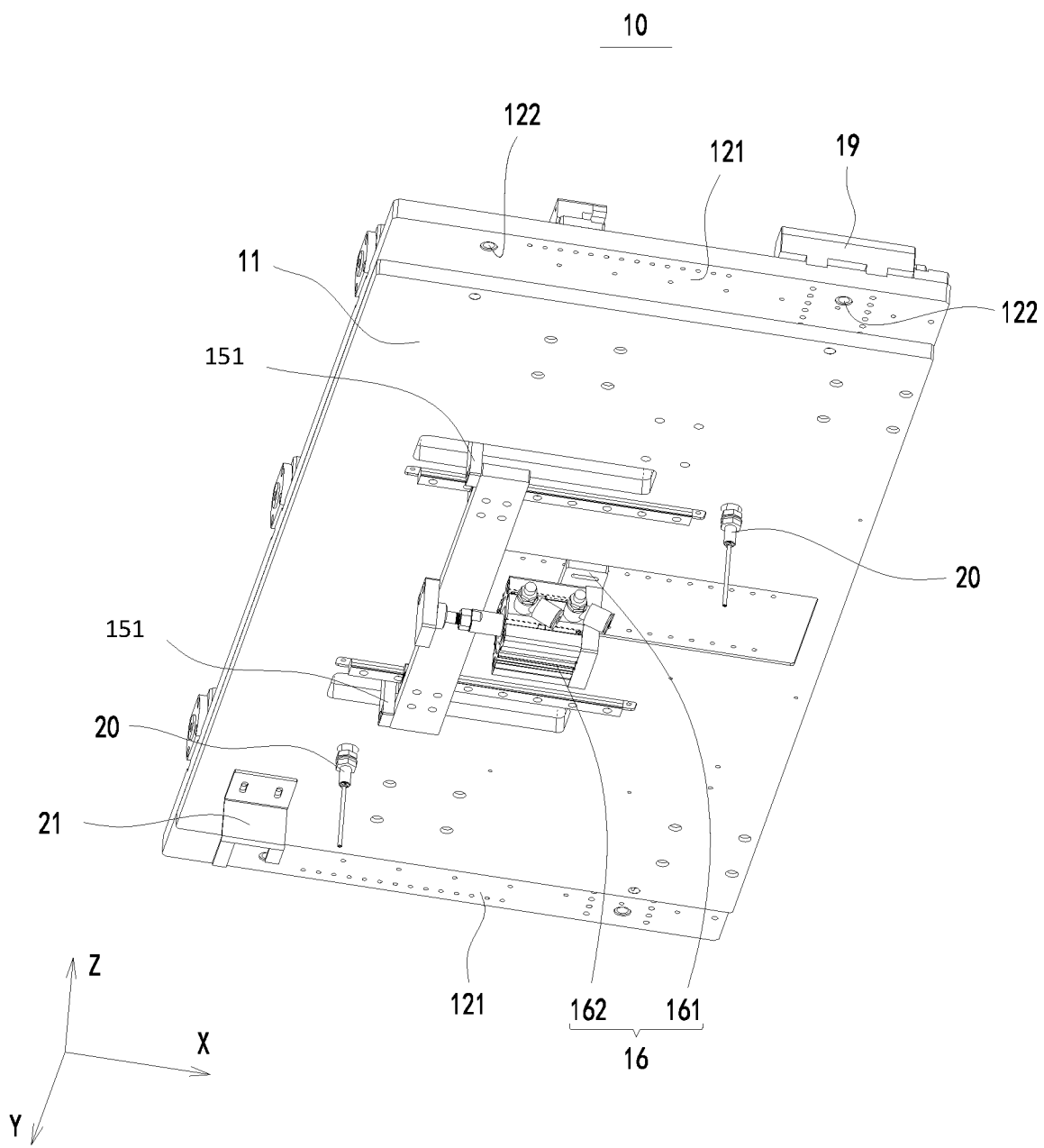
FIG. 2 is a schematic view showing a structure of a clamping apparatus according to one embodiment of the present disclosure from bottom.
Figure 3:
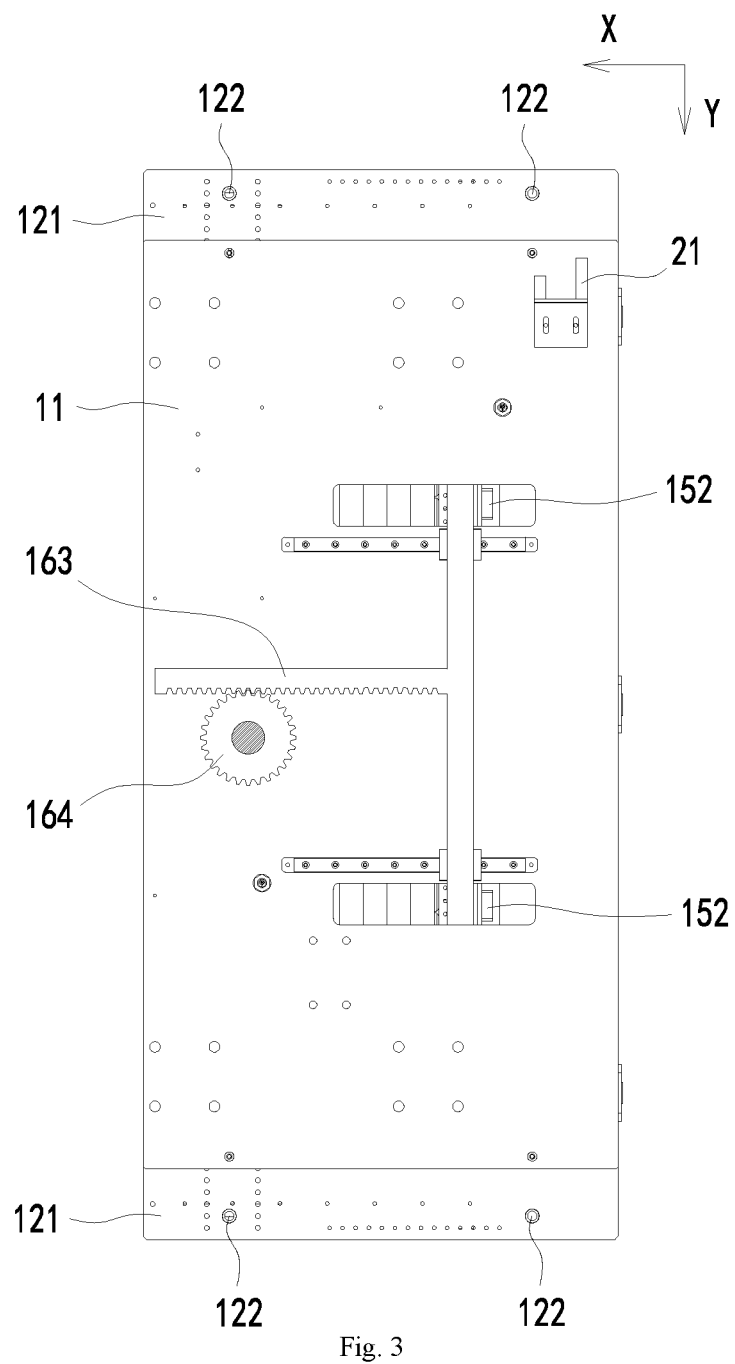
FIG. 3 is a schematic view showing a structure of a clamping apparatus according to a further embodiment of the present disclosure from bottom.

Referring to FIGS. 1 and 2, embodiments of the present disclosure provide a clamping apparatus 10 for clamping and transporting secondary batteries 90. The clamping apparatus 10 of the present embodiment includes a base 11, a support plate 12, a locking assembly 13, and a clamping assembly 14. The base 11 is adapted to support the support plate 12. The support plate 12 is adapted to support a plurality of secondary batteries 90 arranged in a row. The support plate 12 and the base 11 are connected to or separated from each other by the locking assembly 13. The clamping assembly 14 is capable of holding the plurality of secondary batteries 90 arranged in a row to ensure the stability of the secondary batteries 90 during transport process thereof.

The support plate 12 and the base 11 of the present embodiment are stacked in a vertical direction Z. The locking assembly 13 includes a first locking member 131 and a second locking member 132. The first locking member 131 is disposed on the support plate 12. The second locking member 132 is disposed on the base 11. The support plate 12 is movable in the vertical direction Z and is capable of being connected to or separated from the base 11 by the connection of the first locking member 131 to the second locking member 132 or separation of the first locking member 131 from the second locking member 132. A horizontal load is able to be transmitted between the support plate 12 and the base 11 through the first locking member 131 and the second locking member 132 that are locked to each other, so that the support plate 12 can be synchronously carried by the base 11 and horizontally moved, when the base 11 is horizontally moved. In the case that the support plate 12 is subjected to a lifting force in the vertical direction Z, the support plate 12 would move in the vertical direction Z, while the first locking member 131 and the second locking member 132 are separated from each other and the base 11 remains at a current position and does not move. In one embodiment, one of the first locking member 131 and the second locking member 132 is formed as a locking hole and the other one is formed as a locking pin. In another embodiment, the first locking member 131 is formed as a first gear rack and the second locking member 132 is formed as a second gear rack that can engage with the first gear rack.

The clamping assembly 14 of the present embodiment is disposed on a surface of the support plate 12 facing away from the base 11. The clamping assembly 14 includes a first clamping jaw 141 and a second clamping jaw 142 spaced apart in a first horizontal direction X. The first clamping jaw 141 is connected to the support plate 12 in a horizontally movable manner. The first clamping jaw 141 is capable of moving toward or away from the second clamping jaw 142 so as to switch between a clamping position and an opening position. When loading the secondary batteries 90 to the clamping apparatus 10 of the present embodiment, an external force away from the second clamping jaw 142 is applied to the first clamping jaw 141 in advance to move the first clamping jaw 141 from the clamping position to the opening position. After the plurality of secondary batteries 90 are placed between the first clamping jaw 141 and the second clamping jaw 142, the external force away from the second clamping jaw 142 applied to the first clamping jaw 141 is removed and an external force toward the second clamping jaw 142 is applied to the first clamping jaw 141, to move the first clamping jaw 141 from the opening position to the clamping position. As a result, the first clamping jaw 141 and the second clamping jaw 142 can clamp the respective secondary batteries 90 together.

The clamping apparatus 10 of the embodiments of the present disclosure includes a base 11 and a support plate 12 which can be separated from each other, and a clamping assembly 14 disposed on the support plate 12. The base 11 and the support plate 12 are connected to or separated from each other by a locking assembly 13. The support plate 12 is adapted to support a plurality of secondary batteries 90, and the clamping assembly 14 is adapted to clamp and fix the secondary batteries 90. After the clamping assembly 14 has clamped and held the plurality of secondary batteries 90, the clamping apparatus 10 can be moved to a predetermined position, and then the support plate 12 can be lifted in the vertical direction Z by a lifting device, so that the support plate 12 and the clamped and held secondary batteries 90 can be moved to a predetermined unloading position as a whole.

After the support plate 12 is lifted, the base 11 remains in the current position without movement. Thus, on the one hand, the transport operation of the secondary batteries 90 can be completed by the clamping apparatus 10 of the present embodiment, thereby improving an automation level of the transport operation and reducing a labor intensity; on the other hand, if the base 11 is provided with other components and pipelines connected to the other components, the situation that each pipeline needs to undergo tensile stress or bending stress when the base 11 moves in the vertical direction Z, causing breakage or leakage of the pipeline, can be avoided, since when it is required to raise the secondary batteries 90 in the vertical direction Z to the unloading position, the secondary batteries 90 can be transported in the vertical direction Z only by lifting the support plate 12 without the need to move the base 11 in the vertical direction Z; further, since it is only necessary to lift the support plate 12 together with the secondary batteries 90 when lifting the secondary batteries 90, a total weight of the lifting can be reduced, thereby reducing a lifting power requirement of the lifting device, and also increasing the number of secondary batteries 90 which can be transported each time.

Referring to FIG. 2, the support plate 12 of the present embodiment has a vertical lifting portion 121. The support plate 12 bears the lifting force in the vertical direction Z by using the vertical lifting portion 121, so as to be separated from the base 11. The vertical lifting portion 121 is adapted to provide a point of force application for the external lifting device, so that the lifting device can lift the support plate 12 quickly and stably. In one embodiment, each of two opposite edges of the support plate 12 that extend over the base 11 is adapted to form one vertical lifting portion 121.

The clamping apparatus 10 of the present embodiment further includes a clutch mechanism 15 and a drive mechanism 16. The drive mechanism 16 is connected to the first clamping jaw 141 via the clutch mechanism 15. The clutch mechanism 15 can disconnect or transmit a power generated by the drive mechanism 16, such that the power of the drive mechanism 16 can be transmitted or stopped from being transmitted to the first clamping jaw 141 by the clutch mechanism 15. In one embodiment, referring to FIG. 2, the drive mechanism 16 includes a connector 161 disposed below the base 11 and a telescopic element 162 connected to the connector 161. The telescopic element 162 can be an air cylinder or an electric cylinder. The clutch mechanism 15 includes a first insertion portion 151 disposed on the telescopic element 162 and a second insertion portion 152 disposed on the first clamping jaw 141. The first insertion portion 151 and the second insertion portion 152 can be connected together in an insertion manner or separated from each other in the vertical direction Z. When the support plate 12 is separated from the base 11, the first insertion portion 151 and the second insertion portion 152 are also simultaneously separated to stop the transmission of the power of the drive mechanism 16 to the first clamping jaw 141. When the support plate 12 and the base 11 are returned from the separated state to the connected state, the first insertion portion 151 and the second insertion portion 152 are also returned from the separated state to the connected state, to enable the power of the drive mechanism 16 to be transmitted to the first clamping jaw 141. An output portion of the telescopic element 162 can be telescopically moved, so as to move the first clamping jaw 141 in the first horizontal direction X via the first insertion portion 151 and the second insertion portion 152. In a further embodiment, referring to FIG. 3, the drive mechanism 16 includes a gear rack 163 disposed below the base 11 and a gear 164 that engages with the gear rack 163. The gear 164 is connected and fixed to the base 11. The clutch mechanism 15 includes a first insertion portion 151 disposed on the gear rack 163 and a second insertion portion 152 disposed on the first clamping jaw 141. The first insertion portion 151 and the second insertion portion 152 can be connected together in an insertion manner or separated from each other in the vertical direction Z. The gear rack 163 is horizontally movable to move the first clamping jaw 141 in the first horizontal direction X via the first insertion portion 151 and the second insertion portion 152. In one example, one of the first insertion portion 151 and the second insertion portion 152 is formed as an insertion hole extending in the vertical direction Z, and the other is formed as an insertion rod extending in the vertical direction Z. In a further embodiment, the clutch mechanism 15 includes a gear rack and a gear. The gear rack is connected to the first clamping jaw 141 and extends in the first horizontal direction X. The gear is connected to the drive mechanism 16. The drive mechanism 16 can drive the gear to move the gear rack horizontally, and thus move the first clamping jaw 141, so that the first clamping jaw 141 can get close to or away from the second clamping jaw 142.

The clamping apparatus 10 of the present embodiment further includes a telescopic energy storage mechanism 17. The telescopic energy storage mechanism 17 is disposed on the support plate 12. The telescopic energy storage mechanism 17 is connected to the first clamping jaw 141. In one embodiment, the telescopic energy storage mechanism 17 is disposed on the support plate 12 to avoid positional interference with the base 11. When the first clamping jaw 141 is switched from the opening position to the clamping position, the telescopic energy storage mechanism 17 can apply a thrust force toward the second clamping jaw 142 to the first clamping jaw 141. Since the telescopic energy storage mechanism 17 can apply the thrust force toward the second clamping jaw 142 to the first clamping jaw 141 during the transition from the opening position to the clamping position of the first clamping jaw 141, it is possible for the drive mechanism 16 to apply no driving force to the first clamping jaw 141, or to apply a small driving force to the first clamping jaw 141, thereby reducing the power requirement of the drive mechanism 16. Further, after the support plate 12 is separated from the base 11, the telescopic energy storage mechanism 17 can maintain the thrust force toward the second clamping jaw 142 on the first clamping jaw 141, to keep the secondary batteries 90 being clamped by the first clamping jaw 141, thereby reducing the possibility that the secondary batteries 90 are dumped during a lifting process of the support plate 12.

Figure 4:
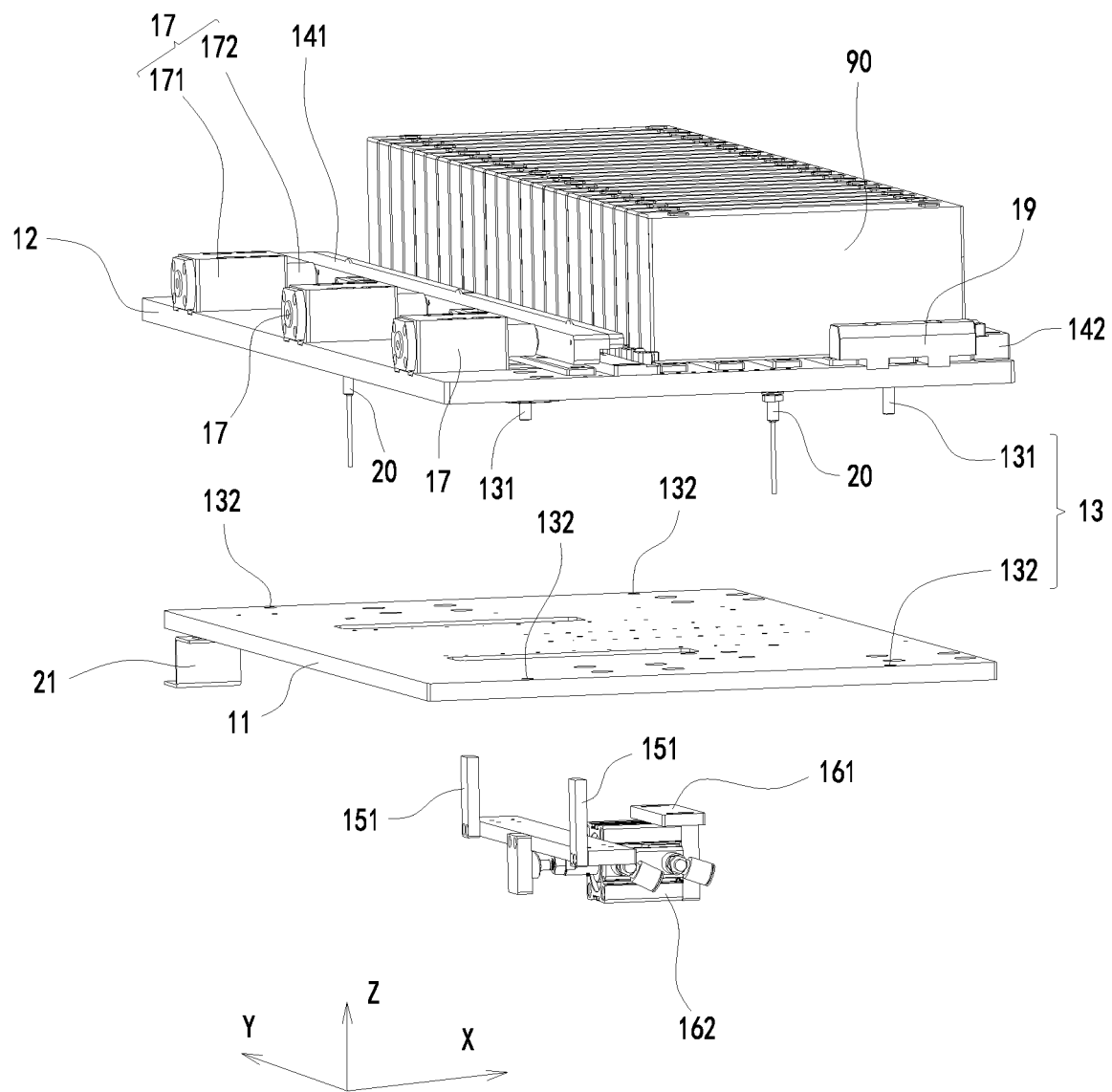
FIG. 4 is a schematic exploded view showing a structure of a clamping apparatus according to one embodiment of the present disclosure.
Figure 5:
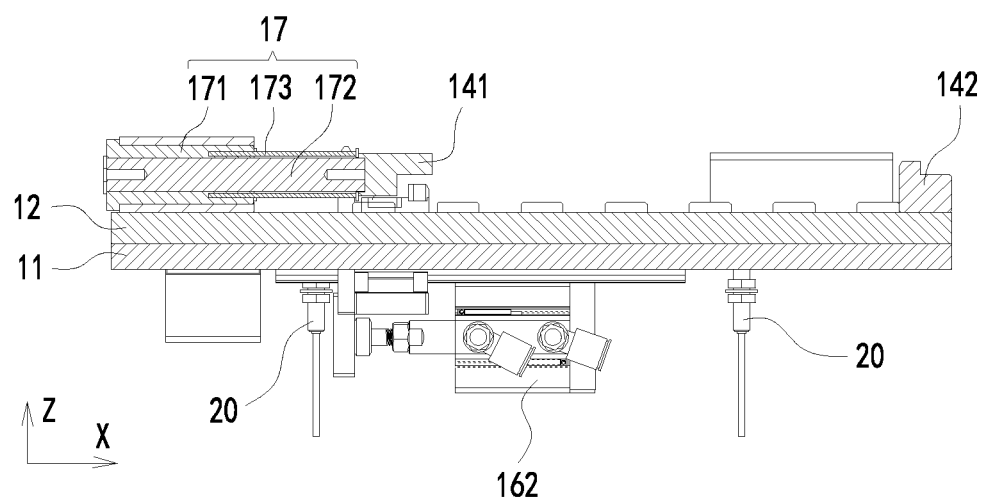
FIG. 5 is a cross-sectional view showing a structure of a clamping apparatus according to one embodiment of the present disclosure.

In one embodiment, as shown in FIGS. 1 and 4, the telescopic energy storage mechanism 17 includes a support member 171 having a receiving portion, a spring 173 disposed on the support member 171, and a telescopic rod 172 disposed on the support member 171 and connected to the spring 173. The telescopic energy storage mechanism 17 is disposed on an outer side of the first clamping jaw 141 such that the first clamping jaw 141 is located between the telescopic energy storage mechanism 17 and the second clamping jaw 142. The telescopic rod 172 is telescopically movable in the first horizontal direction X to extend and compress the spring 173. A free end of the telescopic rod 172 projecting out of the support member 171 is connected to the first clamping jaw 141. When the first clamping jaw 141 is in the clamping position, the spring 173 can apply a thrust force to the first clamping jaw 141 via the telescopic rod 172 such that the first clamping jaw 141 and the second clamping jaw 142 can clamp the secondary batteries 90. The number of the telescopic energy storage mechanisms 17 of the present embodiment may be more than two. More than two telescopic energy storage mechanisms 17 are spaced apart in a second horizontal direction Y, wherein the first horizontal direction X and the second horizontal direction Y intersect with each other. In one example, referring to FIG. 5, the spring 173 is sleeved on an outside of the telescopic rod 172. The support member 171 has a horizontally extending guide hole, into which a part of the telescopic rod 172 is inserted. When the telescopic rod 172 is telescopically moved, the spring 173 can be compressed or released.

Figure 6:
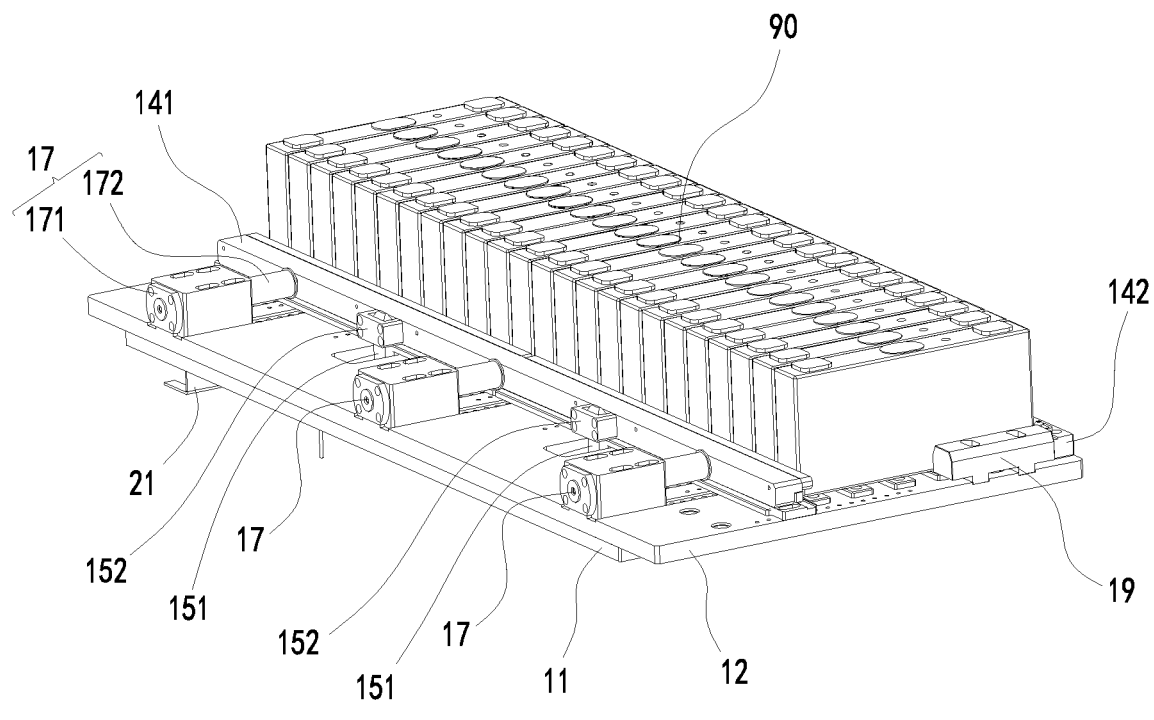
FIG. 6 is a schematic view showing a usage state of a clamping apparatus clamping secondary batteries according to one embodiment of the present disclosure.

Referring to FIGS. 1 and 6, the clamping apparatus 10 of the present embodiment further includes a first limiting block 18 and a second limiting block 19 disposed on the support plate 12. The first limiting block 18 and the second limiting block 19 are spaced apart from each other in the second horizontal direction Y and are both located between the first clamping jaw 141 and the second clamping jaw 142. The first limiting block 18 and the second limiting block 19 are adapted to limit the secondary batteries 90. The first clamping jaw 141, the second clamping jaw 142, the first limiting block 18 and the second limiting block 19 together restrain the secondary batteries 90, effectively maintaining the positional stability of the secondary batteries 90, and reducing the possibility that the secondary batteries 90 displace in the second horizontal direction Y. Optionally, the positions of the first limiting block 18 and the second limiting block 19 on the support plate 12 can be adjusted to decrease or increase a distance between the first limiting block 18 and the second limiting block 19, so as to adjust the number of secondary batteries 90 received between the first limiting block 18 and the second limiting block 19.

In one embodiment, referring to FIG. 4, the clamping apparatus 10 further includes a first object detecting sensor 20 disposed below the support plate 12. During reconnection of the support plate 12, which has been separated from the base 11, with the base 11, the first object detecting sensor 20 on the support plate 12 is used to detect whether the base 11 is located at the current position (where the support plate 12 was separated from the base 11). If it is detected that the base 11 is located below the support plate 12 and kept in the current position, the support plate 12 is lowered until being reconnected with the base 11. If the base 11 is not detected or it is detected that the position of the base 11 changes, the support plate 12 will not be lowered. Thus, the first object detecting sensor 20 can be used to effectively ensure an accuracy of the relative position of the support plate 12 to the base 11, thereby ensuring that the support plate 12 and the base 11 are aligned and connected with each other accurately. Optionally, the first object detecting sensor 20 is a mechanical proximity switch or a photoelectric proximity switch.

Referring to FIG. 4 or FIG. 6, the clamping apparatus 10 of the present embodiment further includes a position sensor triggering member 21 disposed below the base 11 and located at an edge of the base 11. The clamping apparatus 10 needs to be transferred between different stations, and when the clamping apparatus 10 is moved to a certain station, the position sensor triggering member 21 can trigger a position sensor disposed at the station, thereby facilitating to control the clamping apparatus 10 to accurately stop at the station, which is beneficial to improve the automation degree of the transport operation and the transferring accuracy of the clamping apparatus 10.

The clamping apparatus 10 according to the embodiments of the present disclosure includes a support plate 12 and a base 11 which can be separated from each other, and a clamping assembly 14 disposed on the support plate 12 for clamping the secondary batteries 90. The clamping apparatus 10 according to the present embodiment can clamp and hold the secondary batteries 90 and can quickly and conveniently transport the secondary batteries 90, thereby effectively improving the transport efficiency of the secondary batteries 90 and reducing the labor intensity during the transport process of the secondary batteries 90. Further, since the support plate 12 and the base 11 are separable, the transport of the secondary batteries 90 can be achieved by moving the support plate 12 without the need of moving the entire clamping apparatus 10, thereby reducing the difficulty of transporting and reducing the possibility that the pipelines connected to the components set on the base 11 are damaged due to entanglement or bending.

Referring to FIGS. 7-13, an embodiments of the present disclosure further provide a transport device 22 for transporting the secondary batteries 90. The transport device 22 of the present embodiment includes a support platform 23, a first horizontal rail 24 disposed on the support platform 23, the clamping apparatus 10 of the above embodiments, and a lifting assembly 25.

Figure 7:
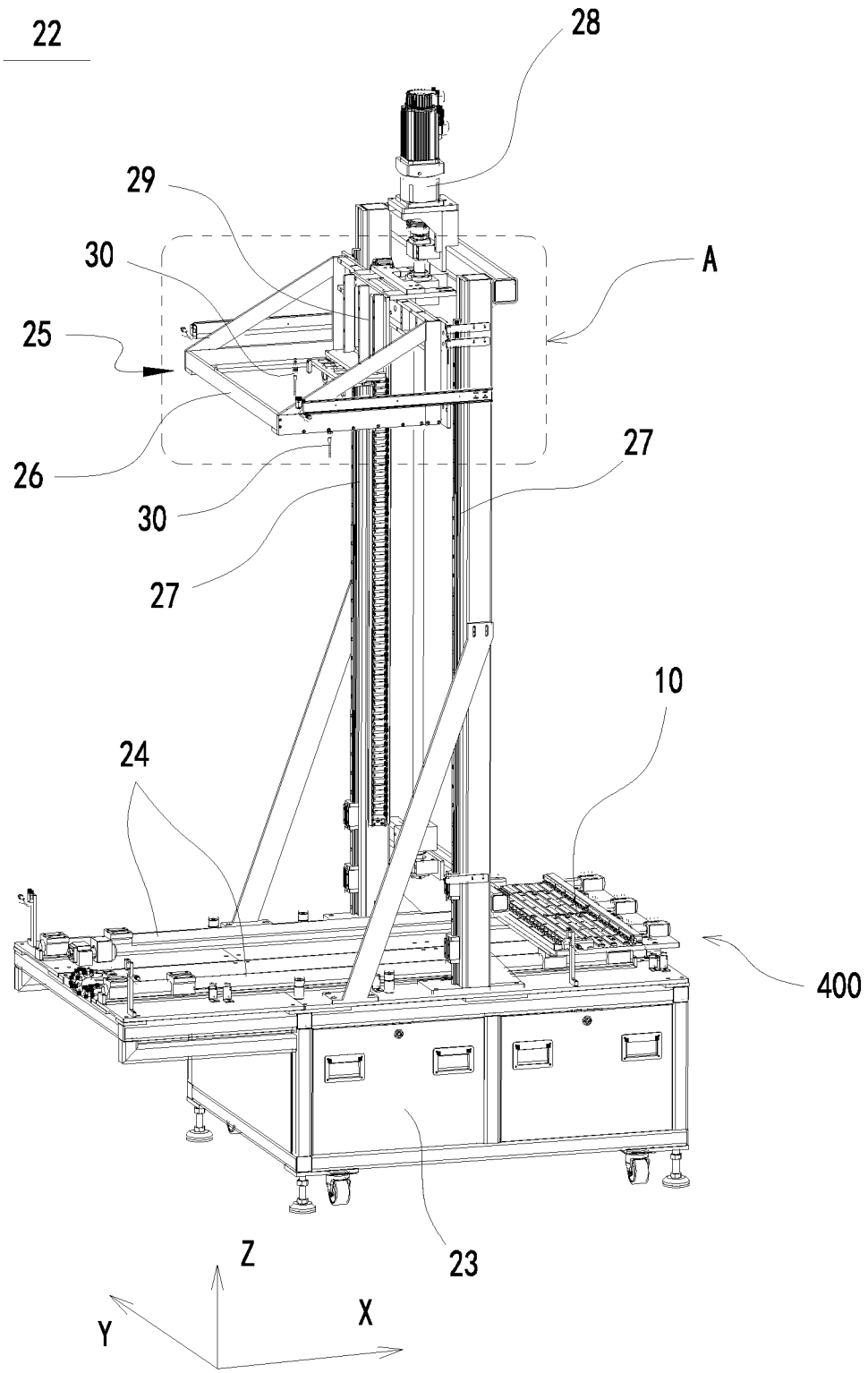
FIG. 7 is a schematic view showing a clamping apparatus in a loading position according to one embodiment of the present disclosure.
Figure 9:
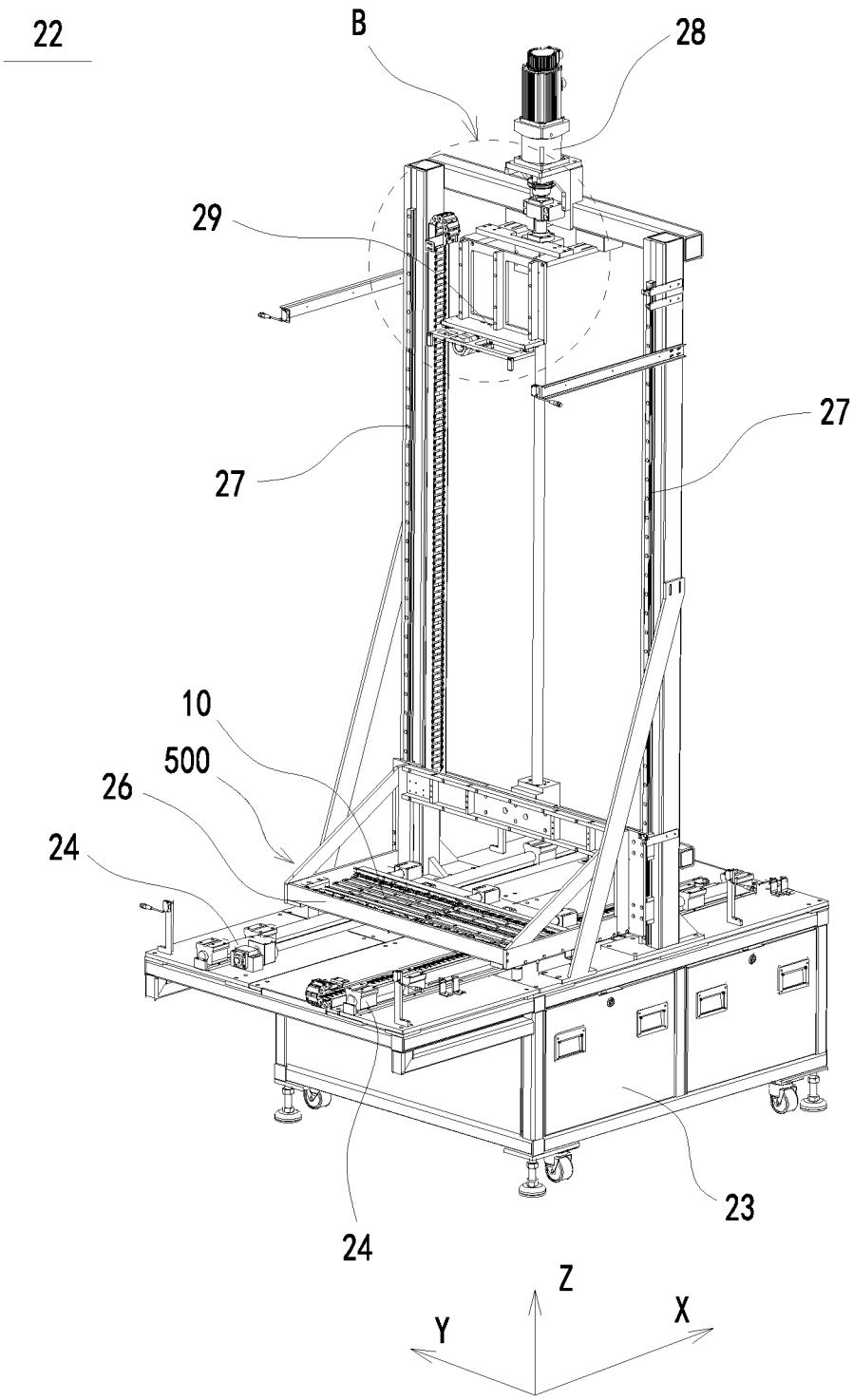
FIG. 9 is a schematic view showing an engagement state of a lifting assembly with a clamping apparatus in a lifting position according to an embodiment of the present disclosure.
Figure 11:
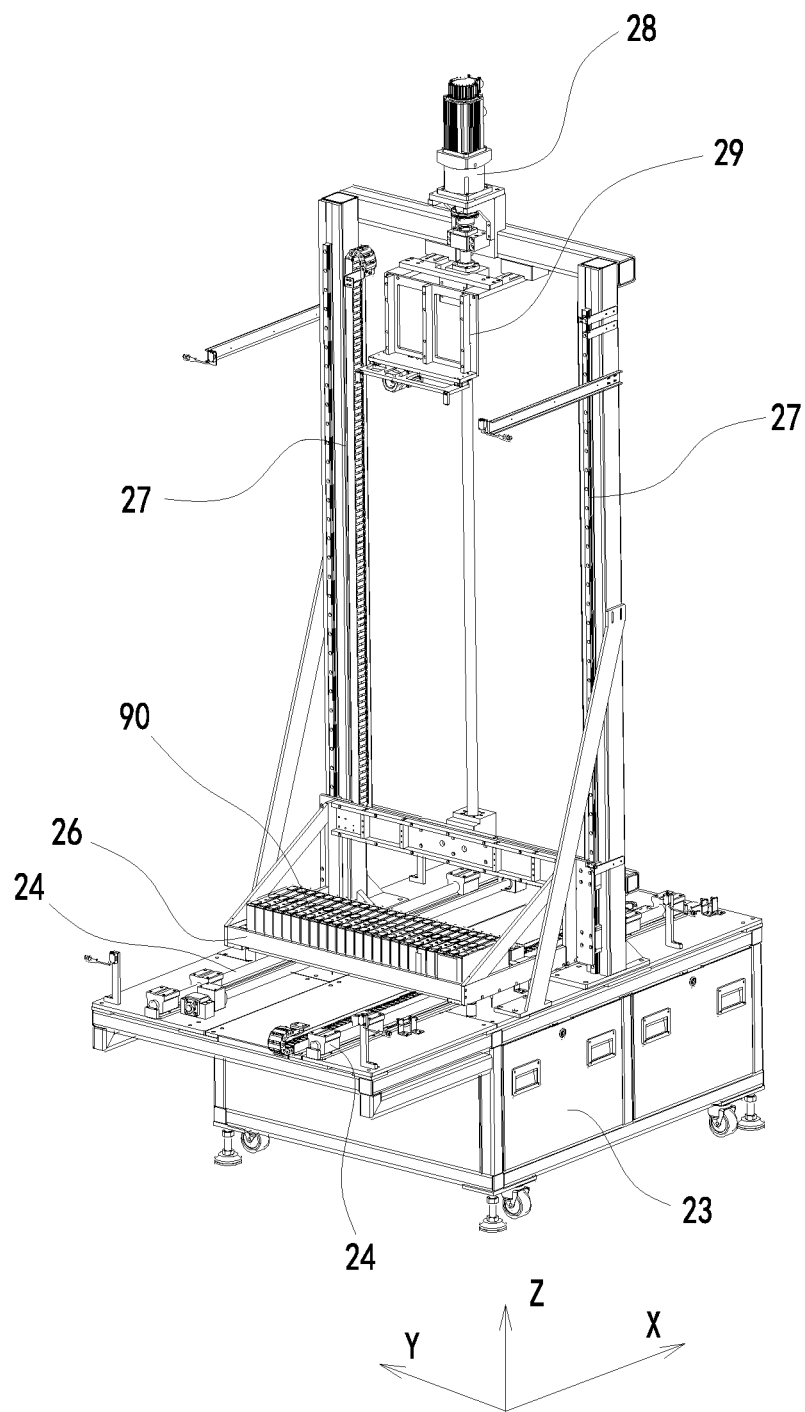
FIG. 11 is a schematic view showing a usage state of a transport device for transporting secondary batteries according to one embodiment of the present disclosure.
Figure 12:
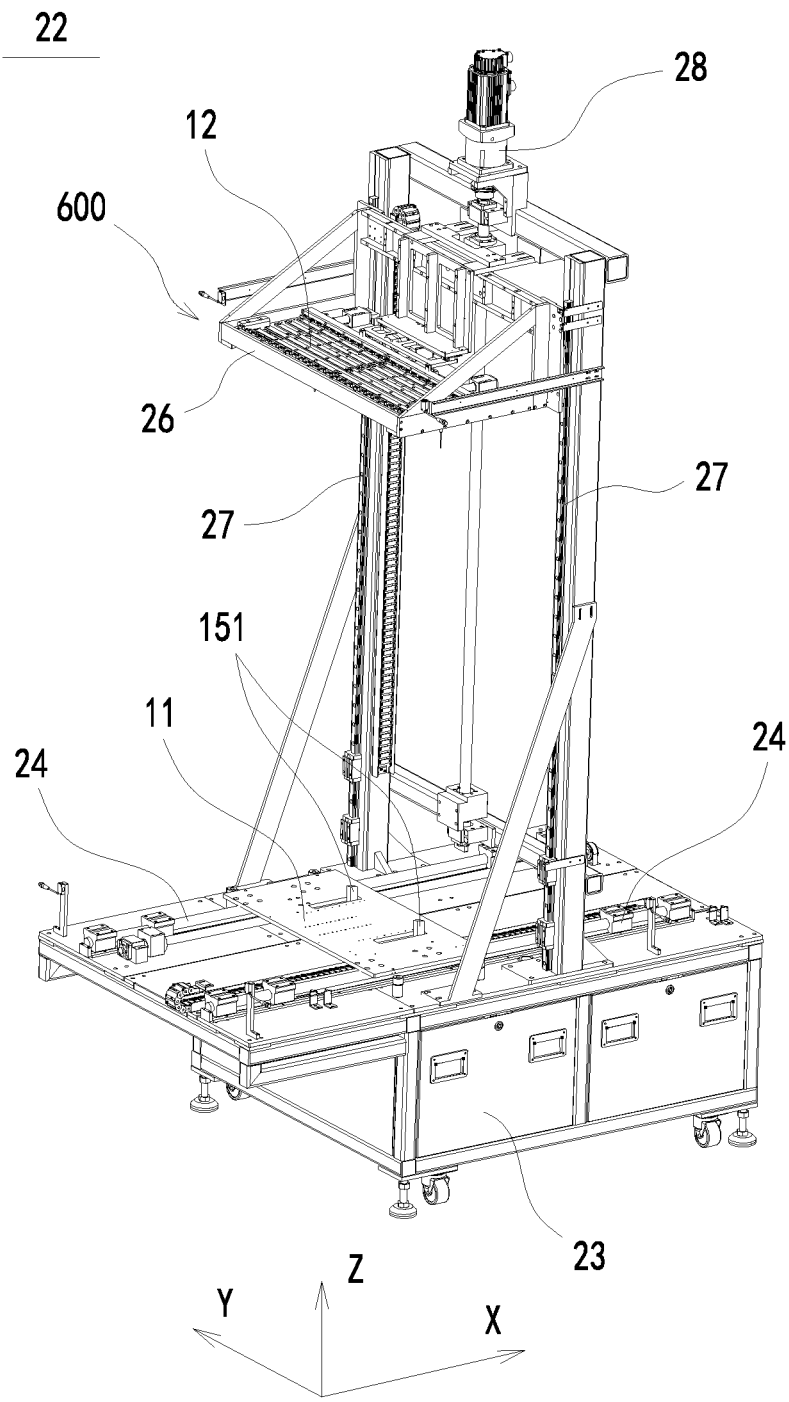
FIG. 12 is a schematic view showing a lifting assembly lifting a support plate to an upper unloading position according to an embodiment of the present disclosure.

Referring to FIGS. 7 and 9, the clamping apparatus 10 of the present embodiment is movably connected to the first horizontal rail 24 via the base 11, so that the clamping apparatus 10 can be switched between a loading position 400 and a lifting position 500 in the horizontal direction. After the loading operation of the secondary batteries 90 is completed at the loading position 400, the clamping apparatus 10 is moved along the first horizontal rail 24 to the lifting position 500, and then the support plate 12 is lifted by the lifting assembly 25. The lifting assembly 25 is capable of lifting the support plate 12 to an upper unloading position 600 in the vertical direction Z. The lifting assembly 25 of the present embodiment is disposed on the support platform 23. The lifting assembly 25 is adapted to lift and lower the support plate 12 in the vertical direction Z at the lifting position 500 to switch the support plate 12 between the lifting position 500 and the upper unloading position 600. Here, FIG. 9 schematically shows a state in which the clamping apparatus 10 is located at the lifting position 500 and the lifting assembly 25 is connected with the clamping apparatus 10. FIG. 11 schematically shows a state in which the clamping apparatus 10 carrying the secondary batteries 90 is located at the lifting position 500. FIG. 12 schematically shows a state in which the support plate 12 is lifted by the lifting assembly 25 to the upper unloading position 600 while the base 11 is left on the first horizontal rail 24.

Figure 13:
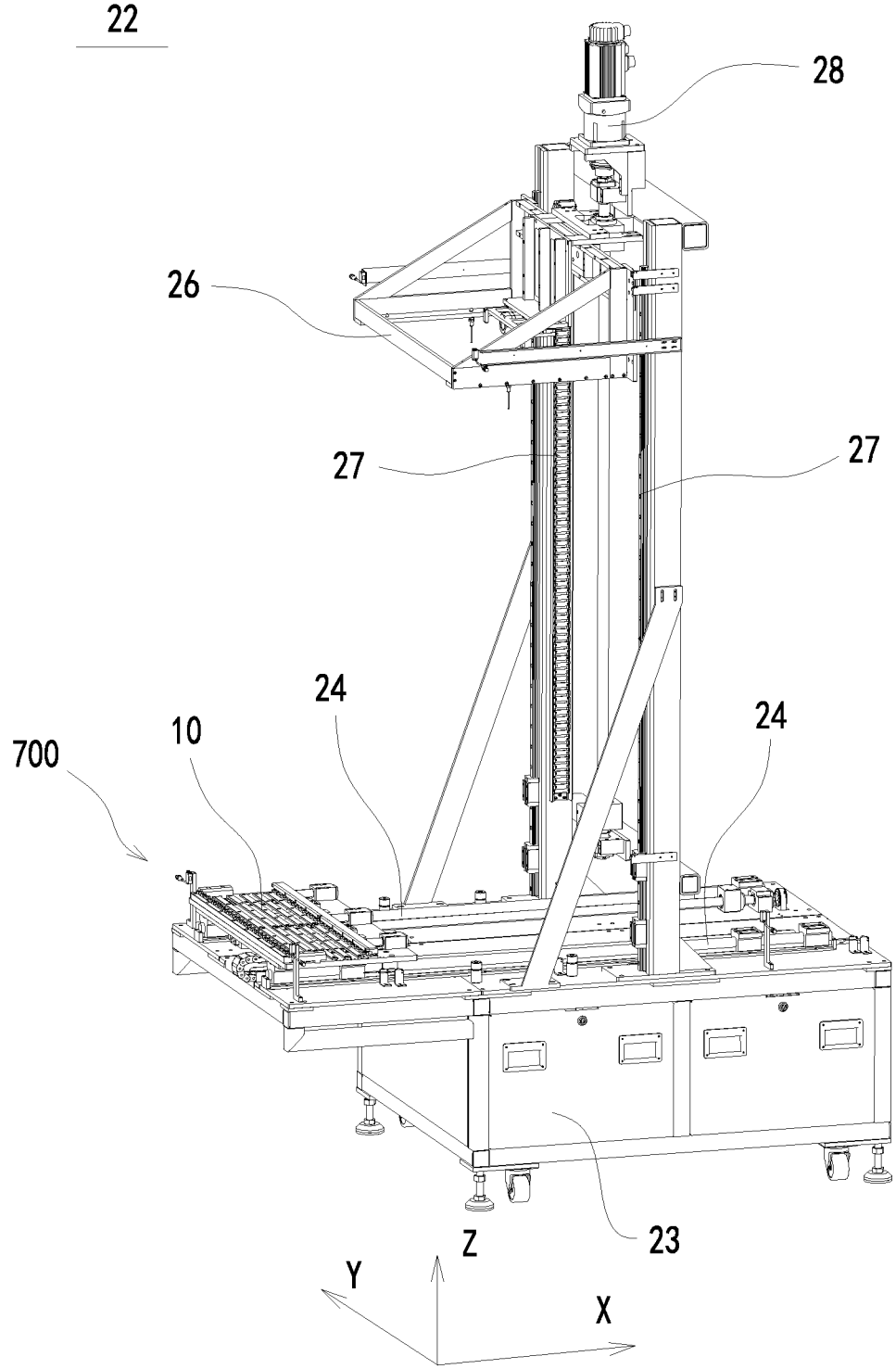
FIG. 13 is a schematic view showing a clamping apparatus in a horizontal unloading position according to one embodiment of the present disclosure.

In one embodiment, referring to FIG. 13, the clamping apparatus 10 further can be moved along the first horizontal rail 24 to a horizontal unloading position 700, to transport the secondary batteries 90 in the horizontal direction. The lifting position 500 of the present embodiment is located between the loading position 400 and the horizontal unloading position 700. The transport device 22 further includes a position sensor (not shown) disposed on the support platform 23. The position sensors can be disposed at the loading position 400, the horizontal unloading position 700, and the lifting position 500, respectively. When the clamping apparatus 10 is moved to any of the loading position 400, the horizontal unloading position 700, and the lifting position 500, the position sensor can be triggered by the position sensor triggering member 21 provided on the support plate 12, so that the clamping apparatus 10 can be accurately stopped at any of the loading position 400, the horizontal unloading position 700, and the lifting position 500. The position sensor of the present embodiment may be a photoelectric proximity switch.

In one embodiment, the transport device 22 has a drive assembly (not shown). The drive assembly is adapted to provide a driving force to the clamping apparatus 10 to move the clamping apparatus 10 along the first horizontal rail 24. Optionally, the drive assembly includes a motor, a screw lever connected to an output shaft of the motor, and a nut. The base 11 is connected to the screw lever via the nut, so that when the motor rotates the screw lever, the clamping apparatus 10 can be moved along the first horizontal rail 24.

The support plate 12 of the present embodiment has a vertical lifting portion 121. The lifting assembly 25 includes a connecting member 26, a vertical rail 27, and a drive unit 28. The connecting member 26 can be connected to the vertical lifting portion 121 to apply a lifting force to the support plate 12. In one embodiment, each of two opposite edges of the support plate 12 that extend over the base 11, is adapted to form one vertical lifting portion 121. In one embodiment, referring to FIG. 8, the connecting member 26 includes a bracket 261 movably connected to the vertical rail 27 and two forked plates 262 connected to the bracket 261. When it is necessary to lift the support plate 12 by using the connecting member 26, the two forked plates 262 of the present embodiment can be inserted below the two vertical lifting portions 121 to apply the lifting force to the vertical lift portions 121, respectively. In one embodiment, the drive unit 28 includes a motor connected and fixed to the vertical rail 27 and a vertical screw lever connected to an output shaft of the motor. The screw lever is screwed to the lifting assembly 25, so that the lifting assembly 25 can move up and down along the screw lever when the motor rotates the screw lever.

Figure 8:
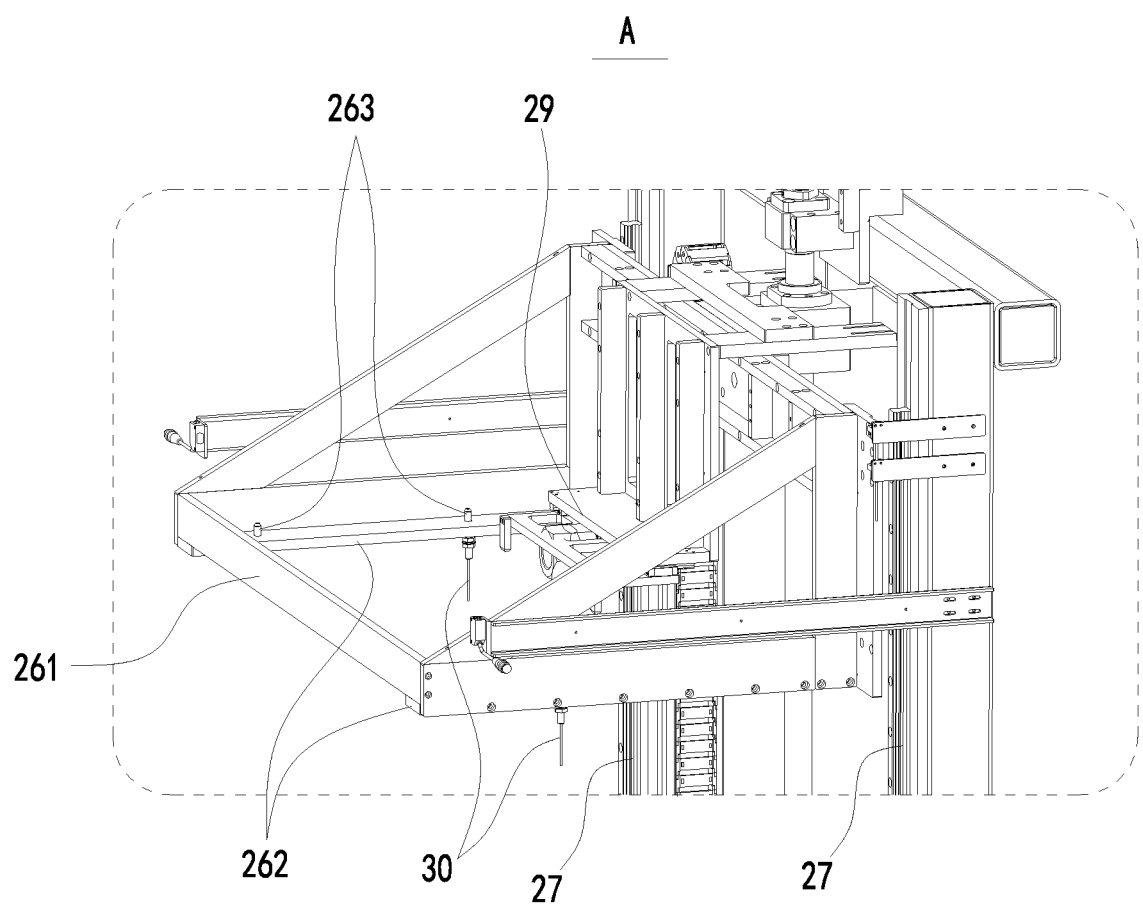
FIG. 8 is an enlarged view of part A in FIG. 7.

Referring to FIGS. 2 and 8, the support plate 12 of the present embodiment has a first positioning portion 122. In the embodiment in which an edge of the support plate 12 extends over the base 11 to form a vertical lifting portion 121, the first positioning portion 122 is disposed on the vertical lifting portion 121. The connecting member 26 has a second positioning portion 263 disposed on the forked plate 262. The support plate 12 and the connecting member 26 can be positioned relative to each other via the first positioning portion 122 and the second positioning portion 263, thereby ensuring accurate positioning of the support plate 12 and the connecting member 26 relative to each other. In one embodiment, the first positioning portion 122 is formed as a positioning hole and the second positioning portion 263 is formed as a positioning pin. It can be easily understood that the first positioning portion 122 may be a positioning pin, and the second positioning portion 263 may be a positioning hole.

Referring to FIG. 7, the transport device 22 of the present embodiment further includes an unlocking mechanism 29. The unlocking mechanism 29 is capable of applying a horizontal force to the first clamping jaw 141 at the upper unloading position 600 to move the first clamping jaw 141 away from the second clamping jaw 142, thereby switching the first clamping jaw 141 from the clamping position to the opening position, to release the secondary batteries 90. After the unlocking mechanism 29 removes the clamping force of the first clamping jaw 141, an unloading device can move the secondary batteries 90 away from the support plate 12. The transport device 22 of the present embodiment can automatically complete the opening operation of the first clamping jaw 141 by the unlocking mechanism 29, which can effectively improve the automation degree of the transport device 22.

Figure 10:
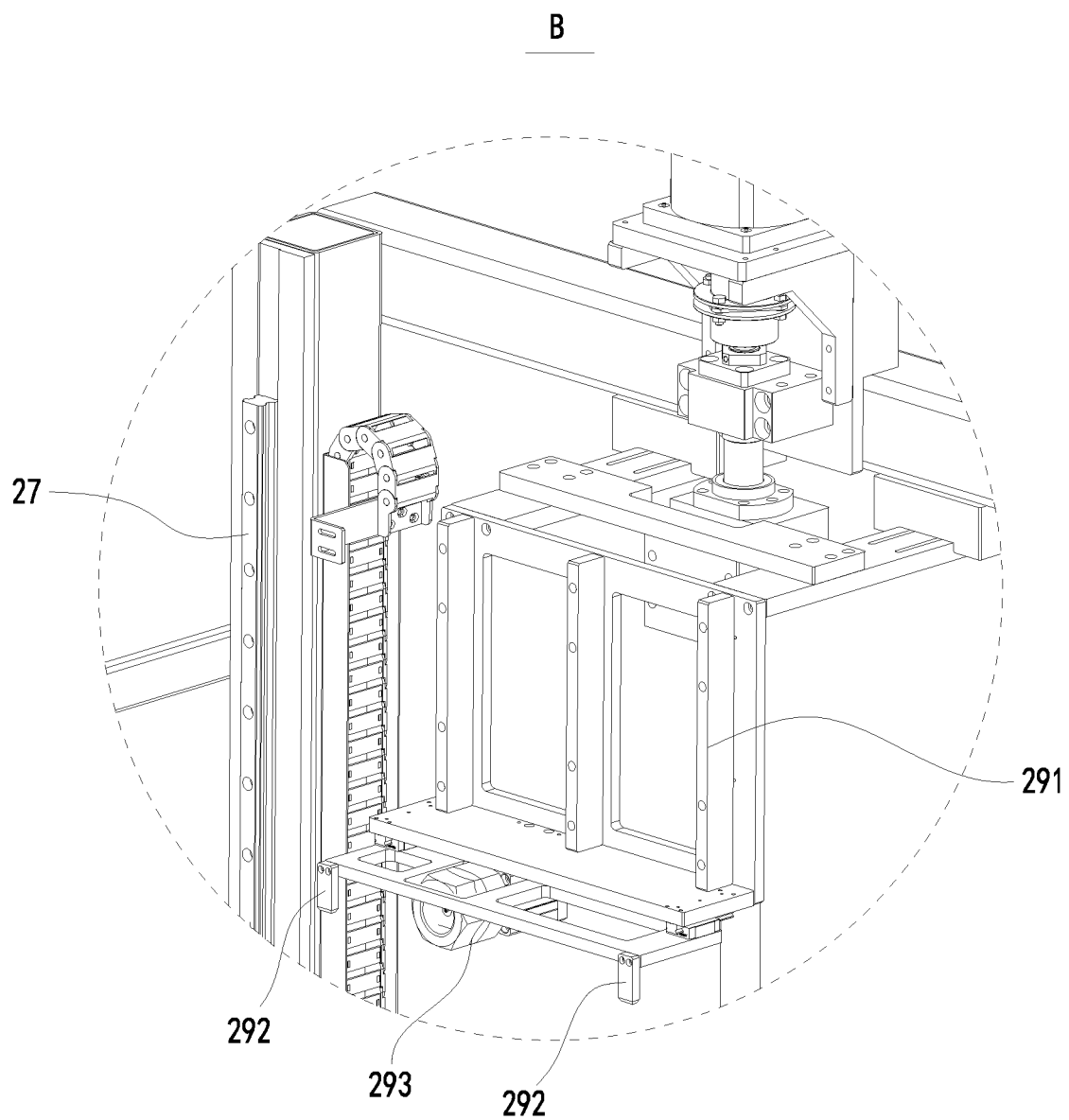
FIG. 10 is an enlarged view of part B in FIG. 9.

In one embodiment, the clamping assembly 14 includes a second insertion portion 152 disposed on the first clamping jaw 141. Referring to FIG. 10, the unlocking mechanism 29 includes a support frame 291 connected to the support platform 23, a third insertion portion 292 horizontally movably connected to the support frame 291, and a drive element 293 connected to the third insertion portion 292. The second insertion portion 152 and the third insertion portion 292 can be connected together in an insertion manner or separated from each other in the vertical direction Z. The drive element 293 is capable of moving the third insertion portion 292 in the first horizontal direction X to apply a horizontal force to the first clamping jaw 141 via the second insertion portion 152. The unlocking mechanism 29 is connected to or separated from the second insertion portion 152 of the first clamping jaw 141 in an insertion manner via the third insertion portion 292, which is advantageous for improving the efficiency of connection operation while ensuring the stability of the connection state between the unlocking mechanism 29 and the first clamping jaw 141.

Referring to FIG. 8, the transport device 22 of the present embodiment further includes a second object detecting sensor 30. The second object detecting sensor 30 is disposed on the lifting assembly 25 and is adapted to detect an object below the lifting assembly 25. When it is prepared to lift the support plate 12 using the lifting assembly 25 included in the transport device 22, the second object detecting sensor 30 detects in advance whether or not there is a clamping apparatus 10 carrying the secondary batteries 90 at the lower lifting position 500. If the clamping apparatus 10 is detected, the lifting assembly 25 is controlled to move down and complete the lifting operation of the support plate 12. If the clamping apparatus 10 is not detected, the lifting assembly 25 continues to wait. When the support plate 12 is unloaded at the upper unloading position 600 and the lifting assembly 25 is ready to carry the support plate 12 down, the second object detecting sensor detects whether the base 11 is still in the current position (from which the support plate 12 was lifted). If it is detected that the base 11 is located below the lifting assembly 25 and remains in the current position, the lifting assembly 25 carries the support plate 12 down until the support plate is reconnected with the base 11. If the base 11 is not detected or it is detected that the position of the base 11 changes, the lifting assembly 25 will stop to move down and trigger an alarm. In this way, the second object detecting sensor can effectively enhance the safety and accuracy of the transport process. Optionally, the second object detecting sensor 30 is a mechanical proximity switch or a photoelectric proximity switch.

The transport device 22 of the embodiments of the present disclosure includes a support platform 23, a first horizontal rail 24, a clamping apparatus 10 of the above embodiments, and a lifting assembly 25. The lifting assembly 25 is capable of raising a support plate 12 in the clamping apparatus 10 by a predetermined height in the vertical direction Z, thereby realizing the positional change of the secondary batteries 90 in the vertical direction Z. Since the lifting assembly 25 only needs to lift the support plate 12, the lifting load requirement is reduced, thereby reducing the power requirement of the lifting assembly 25. The transport device 22 of the present embodiment has a high degree of automation, and can effectively improve the transport efficiency of the secondary batteries 90, and also can reduce the labor intensity during the transport process.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A clamping apparatus for clamping and transporting secondary batteries, the clamping apparatus comprises:
   a base;
   a support plate, stacked with the base in a vertical direction;
   a locking assembly, by which the support plate is connected to the base, wherein the locking assembly comprises a first locking member disposed on the support plate and a second locking member disposed on the base, the support plate is movable in the vertical direction and is capable of being connected to or separated from the base by connection of the first locking member to the second locking member or separation of the first locking member from the second locking member, and a horizontal load is able to be transmitted between the support plate and the base via the first locking member and the second locking member locked to each other; and
   a clamping assembly disposed on a surface of the support plate facing away from the base, and comprising a first clamping jaw and a second clamping jaw spaced apart in a first horizontal direction, wherein the first clamping jaw is connected to the support plate in a horizontally movable manner and is capable of moving toward or away from the second clamping jaw to switch between a clamping position and an opening position.

2. The clamping apparatus according to claim 1, wherein the clamping apparatus further comprises a clutch mechanism and a drive mechanism, wherein the drive mechanism is connected to the first clamping jaw via the clutch mechanism.

3. The clamping apparatus according to claim 2, wherein the drive mechanism comprises a connector disposed below the base and a telescopic element connected to the connector, and the clutch mechanism comprises a first insertion portion disposed on the telescopic element and a second insertion portion disposed on the first clamping jaw, wherein the first insertion portion and the second insertion portion are capable of being connected together in an insertion manner or separated from each other in the vertical direction.

4. The clamping apparatus according to claim 3, wherein one of the first insertion portion and the second insertion portion is formed as an insertion hole extending in the vertical direction, and the other one is formed as an insertion rod extending in the vertical direction.

5. The clamping apparatus according to claim 1, wherein the clamping apparatus further comprises a telescopic energy storage mechanism disposed on the support plate, wherein the telescopic energy storage mechanism is connected to the first clamping jaw and is capable of applying a thrust force toward the second clamping jaw to the first clamping jaw when the first clamping jaw is switched from the opening position to the clamping position.

6. The clamping apparatus according to claim 5, wherein the telescopic energy storage mechanism comprises a support member having a receiving portion, a spring disposed on the support member, and a telescopic rod disposed on the support member and connected to the spring, wherein the telescopic rod is telescopically movable in the first horizontal direction to compress or extend the spring, and a free end of the telescopic rod projecting out of the support member is connected to the first clamping jaw.

7. The clamping apparatus according to claim 1, wherein the clamping apparatus further comprises a first limiting block and a second limiting block disposed on the support plate, wherein the first limiting block and the second limiting block are spaced apart from each other in a second horizontal direction and are both located between the first clamping jaw and the second clamping jaw, the first limiting block and the second limiting block are adapted to limit the secondary batteries, and the first horizontal direction and the second horizontal direction intersect with each other.

8. The clamping apparatus according to claim 1, wherein the clamping apparatus further comprises a first object detecting sensor disposed below the support plate.

9. The clamping apparatus according to claim 1, wherein the clamping apparatus further comprises a position sensor triggering member disposed below the base and located at an edge of the base.

10. The clamping apparatus according to claim 1, wherein the support plate has a vertical lifting portion by which the support plate bears a lifting force in the vertical direction to be separated from the base.

11. A transport device for transporting secondary batteries, the transport device comprises:
    a support platform;
    a first horizontal rail disposed on the support platform;
    a clamping apparatus, comprising:
        a base;
        a support plate, stacked with the base in a vertical direction;
        a locking assembly, by which the support plate is connected to the base, wherein the locking assembly comprises a first locking member disposed on the support plate and a second locking member disposed on the base, the support plate is movable in the vertical direction and is capable of being connected to or separated from the base by connection or separation of the first locking member to or from the second locking member, and a horizontal load is able to be transmitted between the support plate and the base via the first locking member and the second locking member locked to each other; and
        a clamping assembly disposed on a surface of the support plate facing away from the base, and comprising a first clamping jaw and a second clamping jaw spaced apart in a first horizontal direction, wherein the first clamping jaw is connected to the support plate in a horizontally movable manner and is capable of moving toward or away from the second clamping jaw to switch between a clamping position and an opening position, wherein the clamping apparatus is movably connected to the first horizontal rail via the base and being switchable between a loading position and a lifting position; and
    a lifting assembly disposed on the support platform and adapted to lift and lower the support plate in the vertical direction at the lifting position, such that the support plate is switched between the lifting position and an upper unloading position and is connected to or separated from the base.

12. The transport device according to claim 11, wherein the support plate has a vertical lifting portion, and the lifting assembly comprises a connecting member, a vertical rail and a drive unit, wherein the connecting member is capable of being connected to the vertical lifting portion to apply a lifting force to the support plate.

13. The transport device according to claim 12, wherein each of two opposite edges of the support plate that extend over the base is adapted to form one vertical lifting portion, and the connecting member comprises a bracket movably connected to the vertical rail and two forked plates connected to the bracket, wherein the two forked plates are capable of being inserted below the two vertical lifting portions and applying the lifting force to the vertical lifting portions respectively.

14. The transport device according to claim 13, wherein the support plate has a first positioning portion, and the connecting member has a second positioning portion disposed on the forked plates, wherein the support plate and the connecting member are positioned relative to each other via the first positioning portion and the second positioning portion.

15. The transport device according to claim 13, wherein the transport device further comprises an unlocking mechanism capable of applying a horizontal force to the first clamping jaw at the upper unloading position, to move the first clamping jaw away from the second clamping jaw.

16. The transport device according to claim 15, wherein the clamping assembly comprises a second insertion portion disposed on the first clamping jaw, the unlocking mechanism comprises a support frame connected to the support platform, a third insertion portion horizontally movably connected to the support frame, and a drive element connected with the third insertion portion, wherein the second insertion portion and the third insertion portion are capable of being connected together in an insertion manner or separated from each other in the vertical direction, and the drive element is capable of moving the third insertion portion in the first horizontal direction to apply the horizontal force to the first clamping jaw portion via the second insertion portion.

17. The transport device according to claim 11, wherein the transport device further comprises a second object detecting sensor disposed on the lifting assembly and adapted to detect an object below the lifting assembly.

18. The transport device according to claim 11, wherein the clamping apparatus further comprises a clutch mechanism and a drive mechanism, wherein the drive mechanism is connected to the first clamping jaw via the clutch mechanism.

19. The transport device according to claim 11, wherein the clamping apparatus further comprises a telescopic energy storage mechanism disposed on the support plate, wherein the telescopic energy storage mechanism is connected to the first clamping jaw and is capable of applying a thrust force toward the second clamping jaw to the first clamping jaw when the first clamping jaw is switched from the opening position to the clamping position.

20. The transport device according to claim 19, wherein the telescopic energy storage mechanism comprises a support member having a receiving portion, a spring disposed on the support member, and a telescopic rod disposed on the support member and connected to the spring, wherein the telescopic rod is telescopically movable in the first horizontal direction to compress or extend the spring, and a free end of the telescopic rod projecting out of the support member is connected to the first clamping jaw.

* * * * *